(12) United States Patent
Dietl et al.

(10) Patent No.: US 7,991,018 B2
(45) Date of Patent: Aug. 2, 2011

(54) SYSTEM AND METHOD FOR TRANSMITTING AUDIO DATA

(75) Inventors: Michael Dietl, Hamburg (DE); Thomas Kriebisch, Hamburg (DE); Sandra Deimer, Hamburg (DE); Dirk Andersen, Wilster (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/452,442

(22) PCT Filed: May 14, 2008

(86) PCT No.: PCT/EP2008/055884
§ 371 (c)(1),
(2), (4) Date: Dec. 30, 2009

(87) PCT Pub. No.: WO2009/003753
PCT Pub. Date: Jan. 8, 2009

(65) Prior Publication Data
US 2010/0142552 A1    Jun. 10, 2010

Related U.S. Application Data

(60) Provisional application No. 60/947,994, filed on Jul. 5, 2007.

(30) Foreign Application Priority Data

Jul. 5, 2007  (DE) .......................... 10 2007 031 465

(51) Int. Cl.
*H04J 3/04* (2006.01)
(52) U.S. Cl. ........................ 370/534; 370/535
(58) Field of Classification Search .................. 370/533, 370/535, 536, 537, 389, 349
See application file for complete search history.

(56) References Cited

U.S. PATENT DOCUMENTS 5,451,942 A   9/1995  Beard et al.
(Continued)

FOREIGN PATENT DOCUMENTS

DE   102 07 555   9/2002
(Continued)

OTHER PUBLICATIONS

International Search Report for PCT/EP2008/055884, mailed Sep. 10, 2008.
Written Opinion for PCT/EP2008/055884, mailed Sep. 10, 2008.

*Primary Examiner* — Brenda Pham
(74) *Attorney, Agent, or Firm* — Nixon & Vanderhye P.C.

(57) ABSTRACT

The invention relates to a system and method for transmitting audio data in a combined cabin management system in an aircraft with the steps: playing back entertainment programs and providing communications possibilities with an entertainment system (1), which is connected to several first audio data sources (3) and to several first audio playback devices (4), setting and displaying cabin parameters with a control system (2), which is connected to several second audio data sources (8) and to several second audio playback devices (9), transmitting audio data between the control system (2) and the entertainment system (1) with several audio channels (6) each with a coding device (5) and a decoding device (7) respectively. In order to be able to carry out the transmission of audio data and associated information by using commercially available coding chips with the lowest possible expense, the steps are provided: interlinking the audio signals from the several audio data sources (3; 8) into one data stream through a multiplexer (12), via which the coding device (5) is connected to several audio data sources (3; 8), and depacketing the data stream into audio signals for the several audio playback devices (4; 9) through a demultiplexer (15) via which the decoding device (7) is connected to several audio playback devices (4; 9), wherein the audio data are transmitted between the coding device (5) and the decoding device (7) with a predetermined resolution.

16 Claims, 4 Drawing Sheets

U.S. PATENT DOCUMENTS

| | | | |
|---|---|---|---|
| 5,663,962 A * | 9/1997 | Caire et al. | 370/535 |
| 6,275,537 B1 * | 8/2001 | Lee | 375/240.28 |
| 6,438,169 B1 * | 8/2002 | Takashima et al. | 375/240.05 |
| 6,813,777 B1 | 11/2004 | Weinberger et al. | |
| 7,002,994 B1 | 2/2006 | Haendel | |
| 2002/0103554 A1 * | 8/2002 | Coles et al. | 700/94 |

FOREIGN PATENT DOCUMENTS

| | | |
|---|---|---|
| EP | 0 746 908 | 12/2004 |
| WO | WO 94/28679 | 12/1994 |

* cited by examiner

SYSTEM AND METHOD FOR TRANSMITTING AUDIO DATA

This application is the U.S. national phase of International Application No. PCT/EP2008/055884 filed 14 May 2008 which designated the U.S. and claims priority to DE Application No. 10 2007 031 465.7 filed 5 Jul. 2007, and this application claims priority from U.S. Provisional Application No. 60/947,994 filed 5 Jul. 2007; the entire contents of each of which are hereby incorporated by reference.

The invention relates to the transmission of audio data in an aircraft according to the preamble of claim 1 and claim 9 respectively.

In aircraft of the more recent generation a digital cabin communications and management (cabin management intercommunication data) system is installed as the base system. This CID system controls the functions in the aircraft cabin and shows cabin parameters for passengers and crew. These include inter alia the cabin lighting, cockpit and cabin announcements, door lock indicators, emergency signals, no-smoking and seat belt signs, smoke alarms, cabin temperature, water and waste tanks etc. The CIS system is implemented on a central computer (director) which is connected to an interface (director interface board), one or more display and input units for crew members (flight attendant panel) and a data network for the transmission of audio data. The CIS system can be programmed without great effort so that individual wishes of the flight companies can be taken into account.

In addition there is its own system for the entertainment of passengers, the so-called inflight entertainment (IFE) system. The IFE system contains all entertainment media which are available to passengers on board an aircraft during the flight, i.e. email, internet access and computer terminal possibilities at the seat. The system comprises in particular a broadband network, audio installations and video installations above the seats with or without program choice. Since the system is installed on a common main bus (backbone), it is particularly flexible in relation to the possibilities of combining the components, the scalability as well as expandability.

IFE systems are nowadays offered in all wide-bodied aircraft. Only smaller machines are in part not yet equipped with IFE systems, and many are restricted to audio media. The availability of stowage space for components and the weight thereof also plays a part.

In aircraft cabin systems it is necessary that audio channels are provided for the transmission of audio data between the CID system and the IFE system. The channels serve for the transmission of music, updated announcements and preconfigured announcements. The channels must be provided in both directions. The maximum number of channels thereby depends on the number of possible cabin zones which are to be provided with different audio information. Normally the interfaces of the audio channels in the CID system and in the IFE system are designed for the transmission of up to eight channels simultaneously in each direction. Apart from the pure audio information in addition for each channel information is sent about the activation and priority of the relevant channel.

In the prior art the audio channels are implemented by means of individual analogue interfaces, and the additional information are transferred over control lines (so-called key-lines) which are designed as discrete connections. The format for the exchange of data is established in the ARINC standard 819. The ARINC standard 819 describes the coding and transfer of audio data over a digital network in a civil aircraft. This is based on the aim of reducing the extent of special cabling and thus also the system costs and maintenance expense, by providing a restricted number of audio interfaces as standard in the aircraft. The ARINC standard 819 furthermore describes an improved method for distributing audio channels by using a digital audio interface according to the AES-3 protocol in which the analogue buses are replaced by digital buses.

The AES-3 protocol regulates the serial digital transmission of periodically scanned and uniformly quantisized audio signals over two channels on one shielded twisted cable. The transmission rate is selected so that the scanning values of the audio data are transferred, each one per channel, in a scanning period in the time multiplex. Both user and interface related data and also pulse generator data can be transferred which serve for editing and other purposes.

Furthermore methods are known which reproduce several AES-3 channels in the time multiplex (time division multiplex access, TDMA) method into a single physical medium. One example of this is the multi-channel audio digital interface (MADI) or AES 10 standard. Originally with this MADI standard the serial transmission was regulated of 28 AES/EBU frames (56 audio channels) with a resolution of 24 bits with sampling frequencies of 44.1 kHz and 48 kHz respectively. In the most recent version of the MADI standard the channel number has been raised to 32 AES/EBU signals (64 audio channels) with sampling rates of up to 96 kHz and 192 kHz respectively. Transmission media are coaxial cables with a maximum length of 100 m (75 Ohm) or light wave conductors/glass fibres with a maximum length of 2000 m (62.5/125 µm).

All methods require one AES-3 coder per double channel. When multiplexing several AES-3 channels according to the MADI standard on one physical medium there is still an additional corresponding expense to enable "tunnelling" of several channels.

The object of the invention is therefore to provide a system and indicate a method with which the transmission of audio data and associated information can be carried out by using conventional coding chips with the lowest possible expense. In other words as few as possible hardware devices should be used in order to save weight and costs.

This is achieved through the system and method according to claims 1 and 9 respectively. Preferred embodiments of the invention form the subject of the dependent claims.

The invention is based on the following considerations. Several audio channels are multiplexed on one physical medium, but unlike in the prior art the multiplexing does not first take place following coding into the AES-3 format, but already prior to coding into the AES-3 format. One each AES-3 interface for a physical medium is used per transmission direction. This avoids the expense which would be required for multiplexing several AES-3 channels on one medium by way of example according to the MADI standard.

The combined cabin management system according to the invention in an aircraft with an entertainment system for reproducing entertainment programs and producing communications possibilities for passengers in the aircraft which is connected to several first audio data sources for storing and/or recording audio data and to several first audio play-back devices for playing back audio data, a control system for setting and displaying cabin parameters by crew members in the aircraft which is connected to several second audio data sources for storing and/or recording audio data and to several second audio play back devices for playing back audio data, several audio channels in both directions for transmitting audio data as a series of data packets between the control system and the entertainment system each with a coding device for an upward transmission of audio data and a decoding device for a downward reception of audio data and each with an information channel belonging to an audio channel for transmitting channel parameters of the respective audio channel is characterised in that the coding device is connected by a multiplexer to several audio data sources for interlinking the audio signals from the several audio data sources into one data stream and the decoding device is connected by a demultiplexer to several audio play back devices for depacketing the data stream into audio signals for the several audio play-back devices wherein the audio data are transmitted between the coding device and the decoding device with a predetermined resolution.

More particularly not only can two audio channels be packeted into one frame, but basically also more than two audio channels can be transmitted in this way according to the AES-3 format.

In a preferred embodiment of the invention the multiplexer each time packets one audio channel into a subframe and codes the subframes in pairs into each one data frame. It is thereby reached that the data arriving from the audio sources do not have to be reformatted, missing bits are simply filled in with 0 or 1.

In an alternative preferred embodiment of the invention the multiplexer packets each two audio channels in pairs into a subframe and codes the subframes in pairs into each one data frame. It is thereby reached that the transmission rate of audio channels is doubled. This is at the cost of the audio data arriving from the two audio sources having to be embedded into a subframe which requires a slightly higher expense than simply filling up with constant values.

In particular with this alternative embodiment the odd-numbered channels are each packeted by the multiplexer into the 12 LSBs and the even-numbered channels are each packeted thereby into the 12 MSBs of the subframe. It is however understood that other schematics can also be considered.

Generally the multiplexer is controlled by a control unit so that the coding of the first channel each time follows synchronously the coding of the first frame of a 192-frame packet (so-called AES-3 synchronisation). In this way the allocation of the audio source and audio playback unit is very simple to implement.

Preferably the audio data of the individual data sources are each time always allocated to the same data sinks, and the multiplexer and the demultiplexer each follow a predetermined schedule.

Alternatively the channel identification can take place by way of the contents of the audio subframe, i.e. for example by way of the coding of otherwise not used bits of the audio data stream. As a further alternative, control and synchronisation data can be transmitted in a predetermined subframe of a frame.

This produces a very flexible channel allocation.

Correspondingly the method according to the invention for transmitting audio data in a combined cabin management system in an aircraft with the steps:

playing back entertainment programs and providing communications possibilities for passengers in the aircraft with an entertainment system which is connected to several first audio data sources for storing and/or recording audio data and to several first audio playback devices for playing back audio data, setting and displaying cabin parameters by crew members in the aircraft with a control system which is connected to several second audio data sources for storing and/or recording audio data and to several second audio playback devices for playing back audio data, transmitting audio data as a sequence of data packets between the control system and the entertainment system with several audio channels in both directions each with a coding device for an upward transmission of audio data and a decoding device for a downward reception of audio data and transmitting of channel parameters of each audio channel each with one information channel belonging to a audio channel is characterised by interlinking of the audio signals from the several audio data sources into one data stream by a multiplexer, through which the coding device is connected to several audio data sources, and depacketing the data stream into audio signals for the several audio playback devices by a demultiplexer through which the decoding device is connected to several audio playback devices, wherein the audio data are transmitted between the coding device and the decoding device with a predetermined resolution.

The method according to the invention has in addition to the advantages already mentioned those listed below: It avoids a double conversion from digital to analogue and from analogue to digital per channel. Furthermore only one AES-3 coder and decoder is used per transmission direction, which produces a better utilisation of the transmission bandwidth of the medium. Furthermore the maximum bit rate provided in the AES-3 standard is actually utilised.

Further features and advantages of the invention will be apparent from the following description of embodiments of the invention in which reference is made to the accompanying drawing.

The transmission of data over a channel takes place in the following examples according to the AES-3 protocol. According to the AES-3 protocol audio blocks, each containing 192 frames, are transmitted over the transmission path. Each frame consists in turn of 2 subframes. For each subframe in addition to a preamble pre there is transmitted an audio sample with 16, 20 or a maximum of 24 bit dynamic and with 4 information bits v (validity), u (user), c (channel status), p (parity). As a rule one stereo channel is transmitted per frame with the two subframes. The usual scanning frequencies of the audio signal are 32 kHz, 44.1 kHz, 48 kHz, 96 kHz and 192 kHz.

Figure 1:
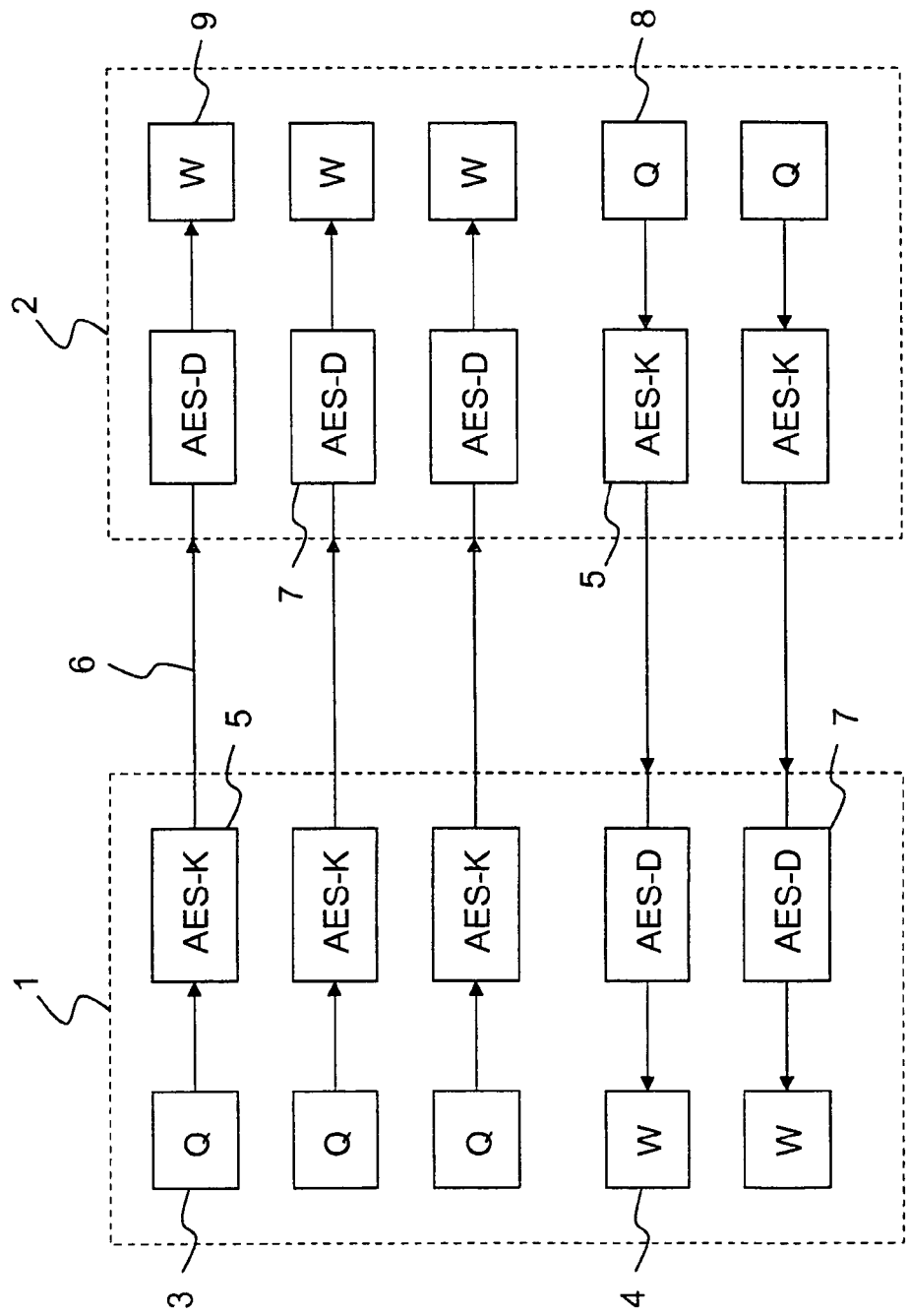
FIG. 1 shows a block circuit diagram for the transmission of audio data between two systems according to the AES protocol according to a first prior art.

FIG. 1 shows an example for transmission of data over data lines according to this AES standard. A first system 1 comprises audio data sources 3 with a predetermined resolution. These audio data sources 3 are marked by Q. The system 1 is thus in particular an IFE system with entertainment and communications devices for the passengers. The audio data of these sources Q are prepared in an AES coder 5 for transmission over a separate longer connecting cable 6. On the opposite side the data are accepted by a second system 2. The system 2 can thus be a control system such as the CID system described above in which the setting of parameters of the aircraft has prominence over the high-quality reproduction of audio signals. The data are first brought back into a suitable form in an AES decoder 7. Then the data are sent to an audio playback device 9 from which they are converted for example into sound. In the example in FIG. 1 it is assumed that the system 1 comprises three audio sources and that the system 2 likewise comprises three audio playback devices 9. This is illustrated in this way for reasons of clarity, but it is self-evident that the numbers of sources and playback devices can be variable.

The transmission of audio data is not restricted to the direction from system 1 to system 2. Obviously data can also be transmitted in the reverse direction from system 2 to system 1 with a predetermined resolution. The corresponding audio sources 8 in the CID system 2 are in turn prepared by AES coders 5 and then transmitted to the IFE system 1 via transmission cables 6. They are received there by an AES decoder 7 and prepared for playback by playback units 4 in the IFE system 1.

The bit stream fixed in the AES-3 can be tunneled in other interface protocols, that is the AES-3 signal is packeted once more, and possibly even repeatedly multiplexed, inside the other protocol. Examples of this are MADI, IEEE1394, AES50.

Figure 2:
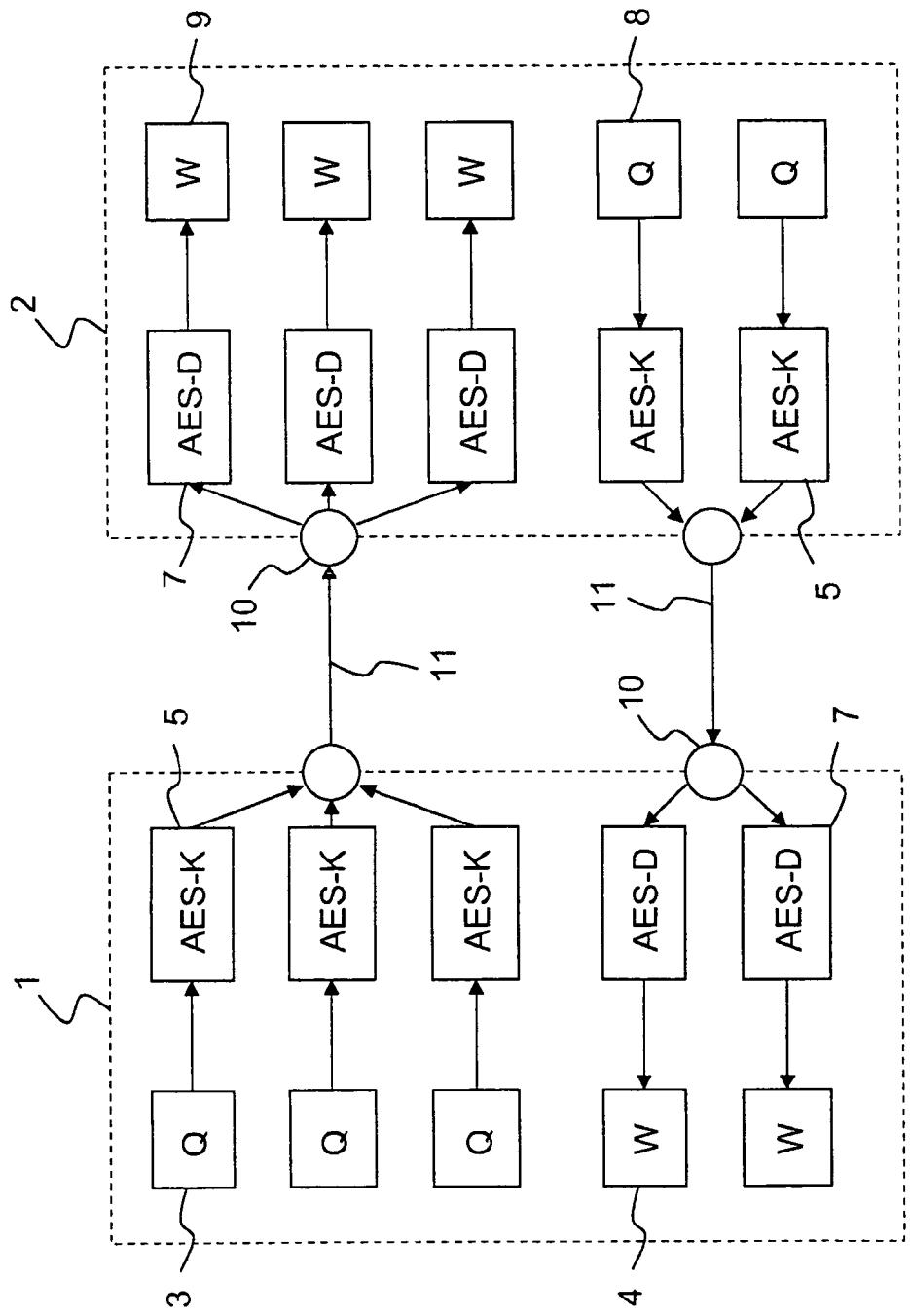
FIG. 2 shows a block circuit diagram for the transmission of audio data between two systems according to the AES protocol according to a second prior art.

FIG. 2 shows a transmission with tunneling. The data in the IFE system 1 have in turn a specific resolution. They are prepared with the MADI protocol, as with the above example from the prior art, initially in an AES coder 5. The AES frames from several AES coders 5 are then interlinked through a MADI controller 10 and transmitted with in some circumstances very much higher bandwidth via the MADI connection 11 to the CID system 2. There they are received by a corresponding MADI controller 10 which selects the individual AES frames and forwards them to the relevant AES decoder 7. The AES decoders 7 restore the audio data again and forward them to the relevant playback units 9. For transmitting this data only the bits with the highest value are taken into consideration again however.

Correspondingly data from audio sources in the CID system 2 are initially again restored through AES coders 5 before being multiplexed in a MADI controller 10 and sent via a connection 11 to the IFE system 1 with predetermined resolution. The data are then forwarded to the playback units 4 in the system 2.

Whereas in the prior art according to FIG. 1 a high expense has to be incurred as regards the connections which are to be provided, with the prior art according to FIG. 2 a high bandwidth is required for the connections. The number of connections in the first case means a high mechanical outlay and undesired increase in weight which particularly in the case of vehicles and even more particularly in the case of aircraft represents a huge disadvantage. In the second case the demands on the connection as regards bandwidth are very high, and the interfaces have to be made correspondingly complicated.

Figure 3:
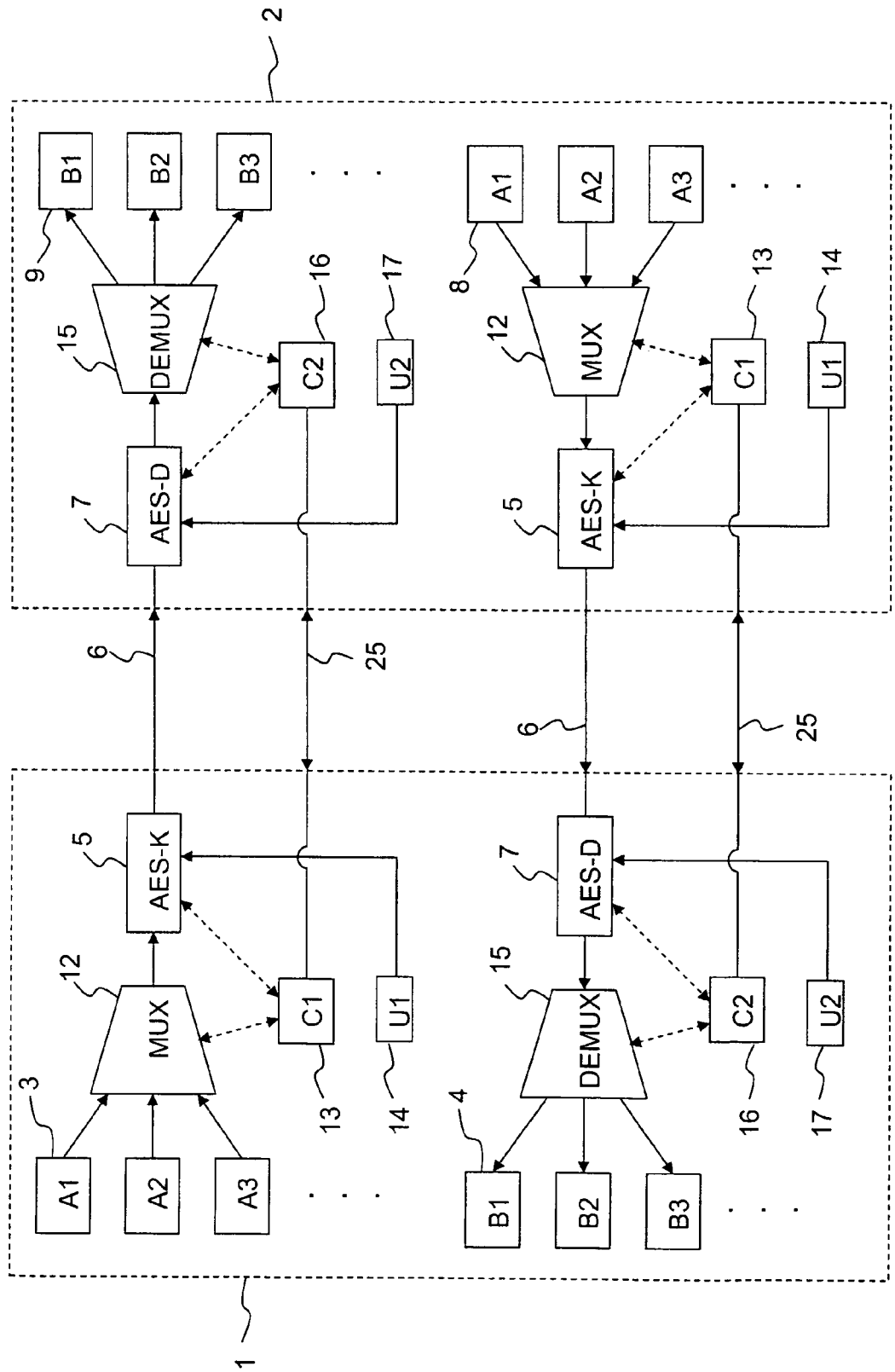
FIG. 3 shows a block circuit diagram for the transmission of audio data between two systems according to the AES protocol according to the invention.

With the proposals according to the invention the drawbacks of the two above methods according to the prior art are overcome. This will be explained in the following with reference to FIG. 3. It is thereby assumed that the transmission is to be implemented by at least 8 channels in each direction as well as a number of reserve channels ("spares") for future applications. For clarity only three audio sources A1 to A3 and three playback units B1 to B3 are shown in both systems 1 and 2. The audio data of the audio sources 3 already exist in digital form. The scanning rate amounts to 32 kSa/s per channel, i.e. 32.000 scanning values per channel and second. The resolution amounts with each audio channel on each side to 12 bit.

According to the invention a digital multiplexer 12 is used between the audio data sources 3 and the AES-3 coding device 5, as well as a digital demultiplexer 15 between the AES-3 decoding device 7 and the audio playback devices 9 as audio data sinks. A complete system, such as is required in a passenger aircraft, comprises two each reciprocally arranged units in order to enable the audio transmission in both directions, and is thus constructed analogous to that shown in FIGS. 1 and 2.

The multiplexer generates at its output a signal which is compatible with the input signal of the AES coder. The inputs of the multiplexer are adjoined by the digital audio data of the audio sources with a scanning rate of 32 kHz and a resolution of 12 bit per channel.

The combined cabin management system according to the invention furthermore comprises two more controllers C1 and C2 for controlling the multiplexer 12 and the demultiplexer 15 and their synchronisation with certain control bits. The multiplexer 12 is controlled by the control unit C1 13 so that the data of the first channel are synchronised exactly with the first bit U1 of the AES-3 user bit data channel, which will be dealt with in more detail below. The user bit U1 is generated in the user bit unit 14. Through the reference to this user bit U1 the correct allocation of the audio channels is ensured at the receiver, which is explained further below with reference to FIG. 4.

Analogously a demultiplexer 15 on the receiver side 2 is controlled by the controller 16. The decoding by the system on the other side proceeds accordingly. The demultiplexer DEMUX receives at its input a signal of the AES-3 decoder which is prepared according to the reversed process as described above so that the audio data are allocated and sent to the data sinks B1, B2, B3 . . . in such form that the audio data of the individual data sources are each always allocated to the same data sinks, e.g. B1=A1, B2=A2, etc. For this the control unit C2 receives a synchronisation signal which is generated by the AES-3 decoder and corresponds to the frame start of the first bit of the user data stream.

Figure 4:
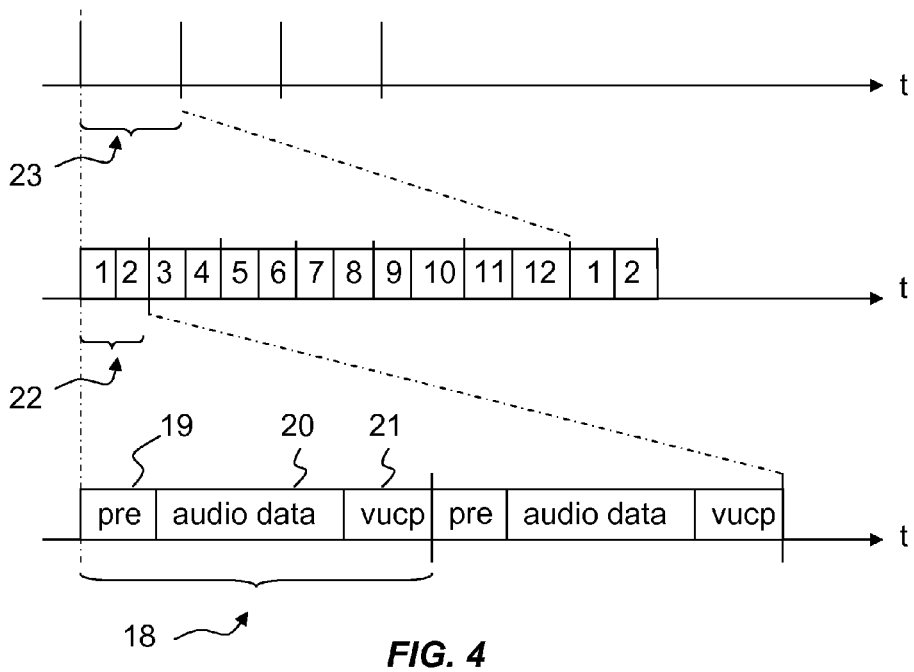
FIG. 4 shows diagrammatically the chronological sequence of data packets and data sequences in the case of a first embodiment of the method according to the invention.

The time path when transmitting data is explained below with reference to FIG. 4 and FIG. 5. As shown in FIG. 4 the multiplexer codes each time in succession the audio channels in pairs into an AES-3 data frame. When the audio source has a lower resolution of for example 12 bit, the 12 bit of each one audio channel is regarded as part of the 24 bit long audio field of an AES-3 subframe 18. Two subframes 18 are combined into one frame 22 (according to the AES-3 protocol) and 12 frames 22 are in turn combined in to one "superframe" 23, of which 16 form one audio block. A subframe 18 is thereby generally composed of a preamble 19 which is marked in FIGS. 4 and 5 by "pre". This preamble 19 is followed by the actual audio data 20 with a resolution of 24 bit. Finally 4 control bits 21 are transmitted which are marked "vucp".

These control bits 21 represent an information channel through which channel parameters of the relevant audio channel are transmitted.

According to the invention the user bit is used in the control bits 21 to characterise the data. In one embodiment the multiplexer MUX is controlled by the control unit C1 so that the data of the first channel are synchronised precisely with the first bit U1 of the AES-3 user bit data channel. The correct allocation of the audio channels is thus ensured at the receiver.

Figure 5:
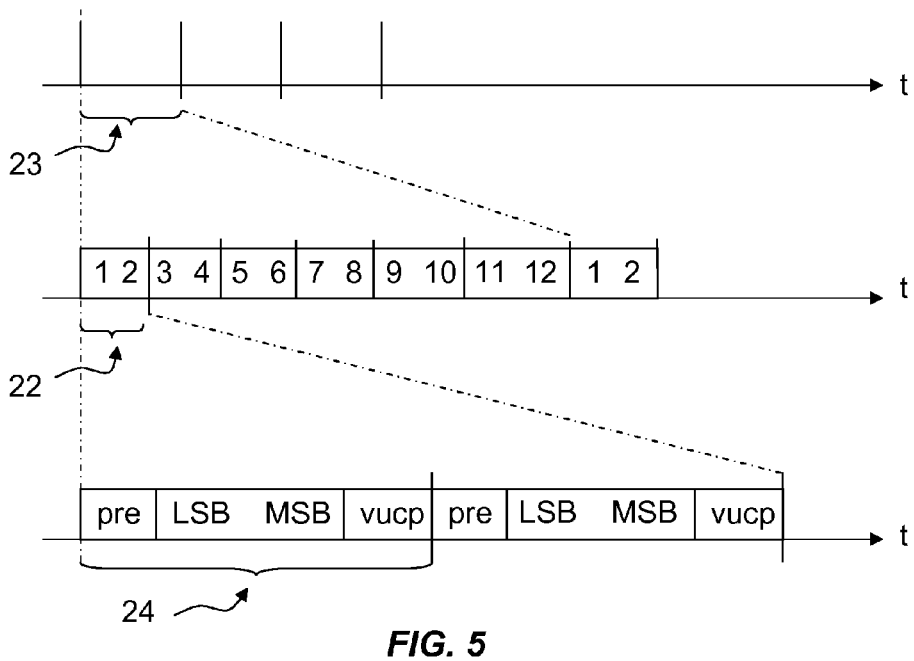
FIG. 5 shows diagrammatically the chronological sequence of data packets and data sequences in the case of a second embodiment of the method according to the invention.

As an alternative to the embodiment in FIG. 4 an embodiment is shown in FIG. 5 in which the multiplexer combines each two 12 bit channels in pairs into a 24 bit data word of an AES-3 subframe 24 whereby here the odd-numbered channels are each coded into the 12 lowest value bits (least significant bits, LSBs), and the even-numbered channels are coded into the 12 highest value (most significant bits, MSBs). The remaining fields are the same as those in FIG. 4 and are not explained in further detail here. It is evident for the person skilled in the art that the allocation of the channel numbers is only shown here by way of example and that any other allocation is equally possible.

The two subframes 24 are again combined into one frame 22 which now transmits 4 sources. By way of example these are in the first frame the sources A1, A2, A3, A4. In the second frame these are the sources A5, A6, A7, A8. With the embodiment according to FIG. 5 the doubled transmission rates are achieved. In other words with this embodiment the required data rate is reduced by the factor 2 which means a higher maximum data throughput. Here though no subsequent increase in the sample resolution (>12 bit) is possible.

This can be generalised to cases in which the resolution of the audio sources amounts by way of example only to 8 bit instead of 12 bit. Then 3 sources can be combined in one AES-3 subframe and up to 6 sources are multiplexed in one frame.

In both cases, i.e. with the method according to FIG. 4 as well as with the method according to FIG. 5, 4 reserve channels can be transmitted each time. The number of transmitted time slots amounts to 12,288, which in the first method corresponds to a bit rate of the transmission channel of 12.288 Mbit/s. The coder thereby works with the maximum audio scanning rate which is provided in the AES-3 standard. In the second method the bit rate amounts to 6.144 Mbit/s.

The decoding through the system on the other side proceeds accordingly. The demultiplexer DEMUX receives at its input a signal of the AES-3 decoder which is prepared according to the reversed process as described above so that the audio data is allocated and sent to the data sinks B1, B2, B3 . . . in such form that the audio data of the individual data sources are each time always allocated to the same data sinks, e.g. B1=A1, B2=A2, etc. For this the control unit C2 receives a synchronisation signal which is generated by the AES-3 decoder and corresponds to the frame start of the first bit of the user data stream.

It is evident for the person skilled in the art that the invention is not restricted to the embodiment described above. Inter alia the following variations are conceivable. The number of audio channels can be selected corresponding to the desired transmission capacities. Likewise the number of channels per AES-3 channel can be selected so that optimum utilisation of the AES-3 channel is provided. Basically a channel identification by the user bit data stream is not absolutely necessary, and thus the channel identification can be undertaken by transmission of control information in the audio LSBs.

In addition there is the possibility of allocating the channel allocation externally. For this in the embodiment according to FIG. 3 an external synchronisation lead 25 is provided via which data can be exchanged between the first control unit 13 and the second control unit 16. The synchronisation signal is thus transmitted outside of the AES-3 interface.

LIST OF REFERENCE NUMERALS

1 First audio system
2 Second audio system
3 Audio source in the first system
4 Audio playback device and audio data sink respectively in the first system
5 AES coder
6 Transmission channel
7 Audio source in the second system
8 Audio playback device and audio data sink respectively in the second system
9 MADI controller
10 MADI transmission channel
11 Multiplexer
12 First control unit
13 First user bit unit
14 Demultiplexer
15 Second control unit
16 Second user bit unit
17 Subframe with 24 bit audio data from one source
18 Preamble
19 Audio data
20 Information field
21 Frame
22 Super frame
23 Subframe with 2×12 bit audio data from two sources
24 External synchronisation lead

The invention claimed is:

1. A combined cabin management system in an aircraft, said management system comprising an entertainment system, a control system and several audio channels connecting the entertainment system with the control system, wherein said entertainment system is configured for playing back entertainment programs and providing communications possibilities for passengers in the aircraft, and said entertainment system is connected to several first audio data sources for storing and/or recording audio data and to several first audio playback devices for playing back audio data, said control system is configured for setting and displaying cabin parameters by crew members in the aircraft, said control system is connected to several second audio data sources for at least one of storing and recording audio data and to several second audio playback devices for playing back audio data, said several audio channels in both directions are configured for transferring audio data as a series of data packets between the control system and the entertainment system, each of said entertainment and control systems having a coding device for an upward transmission of audio data and a decoding device respectively for a downward reception of audio data and each of said audio channels having an information channel for transmitting channel parameters of the relevant audio channel, wherein each coding device is connected by a multiplexer to said several audio data sources of the respective system for interlinking audio data from said several audio data sources into one data stream; and each decoding device is connected by a demultiplexer to said several audio playback devices of the respective system for depacketing the data stream into audio data for the several audio playback devices, wherein the audio data are transmitted between respective coding devices and decoding devices with a predetermined resolution.

2. The system according to claim 1 in which the multiplexer packets each audio channel into a subframe and codes the subframes in pairs into each one data frame.

3. The system according to claim 1 in which the multiplexer packets each two audio channels in pairs into a subframe and codes the subframes in pairs each into one data frame.

4. The system according to claim 3 in which the multiplexer packets the odd-numbered channels each into the 12 least significant bits and the even-numbered channels each into the 12 most significant bits of the subframe.

5. The system according to claim 1 in which the multiplexer is controlled by a control unit so that each of the transmitted channels starts with a predetermined bit in each data packet.

6. The system according to claim 1 in which the demultiplexer receives at its input a signal of the decoder with which it can allocate the received audio channels in a clear manner to the destination channels so that the audio data of the individual data sources are each always allocated to the same audio playback device.

7. The system according to claim 1 in which a channel identification takes place by the transmission of identification details for the relevant audio channel in the 12 least significant bits of the subframe.

8. The system according to claim 1 in which a channel identification takes place through the transmission of an additional synchronisation signal.

9. A method for transferring audio data in a combined cabin management system in an aircraft including an entertainment system, a control system and several audio channels connecting said entertainment system and said control system, said method comprising the steps of:

playing back entertainment programs and providing communications possibilities for passengers in the aircraft with said entertainment system connected to several first audio data sources for at least one of storing and recording audio data and to several first audio play-back devices for playing back audio data, setting and displaying cabin parameters by crew members in the aircraft with said control system connected to several second audio data sources for at least one of storing and recording audio data and to several second audio playback devices for playing back audio data, transferring audio data as a sequence of data packets between the control system and the entertainment system with several audio channels in both directions with a coding device in each of said systems for an upward transmission of audio data and a decoding device in each of said systems for a downward reception of audio data, transmitting channel parameters of each respective audio channel each with one information channel belonging to an audio channel, interlinking the audio signals from the several audio data sources of a respective system into one data stream through a multiplexer by which the coding device is connected to several audio data sources, and depacketing the data stream into audio data for the several audio playback devices of the respective system through a demultiplexer via which the decoding device is connected to several audio playback devices wherein the audio data are transmitted between the coding device and the decoding device with a predetermined resolution.

10. The method according to claim 9 in which the multiplexer packets each one audio channel into a subframe and codes the subframes in pairs into each one data frame.

11. The method according to claim 9 in which the multiplexer packets each two audio channels in pairs into one frame and codes the subframes in pairs into each one data frame.

12. The method according to claim 11 in which through the multiplexer the odd-numbered channels are each packeted into the 12 least significant bits and the even-numbered channels are each packeted into the 12 most significant bits of the subframe.

13. The method according to claim 9 in which the multiplexer is controlled by a control unit so that each of the transmitted channels starts with a predetermined bit in each data packet.

14. The method according to claim 9 in which the demultiplexer receives at its input a signal of the decoder with which it can allocate the received audio channels in a clear manner to the destination channels so that the audio data of the individual data sources are each always allocated to the same audio playback devices.

15. The method according to claim 11 in which a channel identification takes place through transmitting identification details for each relevant audio channel in the 12 least significant bits of the subframe.

16. The method according to claim 9 in which a channel identification takes place through the transmission of an additional synchronisation signal.

* * * * *